(12) United States Patent
Ishii

(10) Patent No.: US 12,340,135 B2
(45) Date of Patent: Jun. 24, 2025

(54) IMAGE PROCESSING APPARATUS, IMAGE PROCESSING METHOD, AND STORAGE MEDIUM

(71) Applicant: CANON KABUSHIKI KAISHA, Tokyo (JP)

(72) Inventor: Masatoshi Ishii, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 18/326,798

(22) Filed: May 31, 2023

(65) Prior Publication Data

US 2023/0393795 A1 Dec. 7, 2023

(30) Foreign Application Priority Data

Jun. 2, 2022 (JP) ................................. 2022-090068

(51) Int. Cl.
*G06F 3/14* (2006.01)
*G06F 3/04812* (2022.01)
*G06T 3/40* (2006.01)

(52) U.S. Cl.
CPC ............ *G06F 3/14* (2013.01); *G06F 3/04812* (2013.01); *G06T 3/40* (2013.01)

(58) Field of Classification Search
CPC ...... G06F 3/04815; G06F 3/0485; G06F 3/01; G06F 3/0482; G06F 3/011; G06F 3/14; G06F 3/04812; G06T 3/40
See application file for complete search history.

(56) References Cited

U.S. PATENT DOCUMENTS

| | | | | |
|---|---|---|---|---|
| 6,054,989 A | * | 4/2000 | Robertson | G06F 3/04815 715/848 |
| 6,160,553 A | * | 12/2000 | Robertson | G06F 3/04815 715/848 |
| 6,166,738 A | * | 12/2000 | Robertson | G06F 3/04815 715/848 |
| 6,188,405 B1 | * | 2/2001 | Czerwinski | G06F 3/0481 715/764 |
| 6,243,093 B1 | * | 6/2001 | Czerwinski | G06F 16/907 715/848 |

(Continued)

FOREIGN PATENT DOCUMENTS

| | | |
|---|---|---|
| JP | 2018023026 A | 2/2018 |
| WO | 2013145536 A1 | 10/2013 |

*Primary Examiner* — Olga V Merkoulova
(74) *Attorney, Agent, or Firm* — Canon U.S.A., Inc. IP Division

(57) ABSTRACT

An image processing apparatus includes an image acquisition unit configured to acquire a first thumbnail image having a first angle of view recorded in an image file, an image generation unit configured to generate a second thumbnail image having a second angle of view different from the first angle of view, an image setting unit configured to set a thumbnail image to be displayed in a thumbnail display area depending on whether a cursor operated by a user is located in the thumbnail display area on a screen, and a display unit configured to display a thumbnail image set by the image setting unit in the thumbnail display area on the screen, wherein, in a case where a cursor is located in the thumbnail display area on the screen, the image setting unit sets the second thumbnail image as a thumbnail image to be displayed in the thumbnail display area.

12 Claims, 10 Drawing Sheets

(56) References Cited

U.S. PATENT DOCUMENTS

| | | | | |
|---|---|---|---|---|
| 6,414,677 B1* | 7/2002 | Robertson | | G06F 3/04815 715/848 |
| 7,545,413 B2* | 6/2009 | Lee | | H04N 5/2624 348/231.2 |
| 7,900,823 B1* | 3/2011 | Knouff | | G06Q 20/042 235/379 |
| 8,521,255 B2* | 8/2013 | DiSilvestro | | A61B 34/20 600/407 |
| 8,768,097 B2* | 7/2014 | Wang | | H04N 5/144 382/284 |
| 8,930,999 B1* | 1/2015 | Maeng | | H04N 21/2365 709/219 |
| 9,736,526 B2* | 8/2017 | Matejka | | H04N 21/8153 |
| 9,824,497 B2* | 11/2017 | Goto | | G06T 7/74 |
| 10,477,134 B2* | 11/2019 | Lim | | G06F 3/0312 |
| 10,540,003 B2* | 1/2020 | Hong | | G06F 3/012 |
| 10,627,628 B2* | 4/2020 | Shinohara | | G02B 27/017 |
| 10,645,283 B2* | 5/2020 | Seo | | H04N 13/189 |
| RE49,051 E* | 4/2022 | Baxley | | G06Q 30/02 |
| 11,681,866 B2* | 6/2023 | Jon | | G06F 3/04886 715/230 |
| 11,861,293 B1* | 1/2024 | Scott | | G06F 3/04817 |
| 12,073,073 B2* | 8/2024 | Ly | | G06F 3/0488 |
| 2007/0121141 A1* | 5/2007 | Takabayashi | | G06K 15/1872 358/1.9 |
| 2009/0249208 A1* | 10/2009 | Song | | G11B 27/3081 715/721 |
| 2010/0111429 A1* | 5/2010 | Wang | | H04N 9/646 382/233 |
| 2010/0281371 A1* | 11/2010 | Warner | | G11B 27/34 715/723 |
| 2011/0055759 A1* | 3/2011 | Robert | | G06F 16/4387 715/825 |
| 2011/0098577 A1* | 4/2011 | DiSilvestro | | A61B 90/36 600/476 |
| 2013/0124676 A1* | 5/2013 | Mochizuki | | H04N 21/41415 709/217 |
| 2013/0212534 A1* | 8/2013 | Knight | | G06F 3/0482 715/838 |
| 2015/0070389 A1* | 3/2015 | Goto | | G06T 7/00 345/633 |
| 2015/0185967 A1* | 7/2015 | Ly | | G06F 3/0488 715/720 |
| 2016/0132991 A1* | 5/2016 | Fukushi | | G06F 3/04815 345/667 |
| 2017/0116709 A1* | 4/2017 | Wang | | H04N 5/144 |
| 2017/0322622 A1* | 11/2017 | Hong | | G06F 3/041 |
| 2018/0041699 A1* | 2/2018 | Tohara | | H04N 13/344 |
| 2018/0070011 A1* | 3/2018 | Seo | | H04N 21/47 |
| 2018/0199001 A1* | 7/2018 | Lim | | H04N 21/42204 |
| 2019/0219824 A1* | 7/2019 | Shinohara | | G06F 3/011 |
| 2023/0393795 A1* | 12/2023 | Ishii | | G06T 3/40 |

* cited by examiner

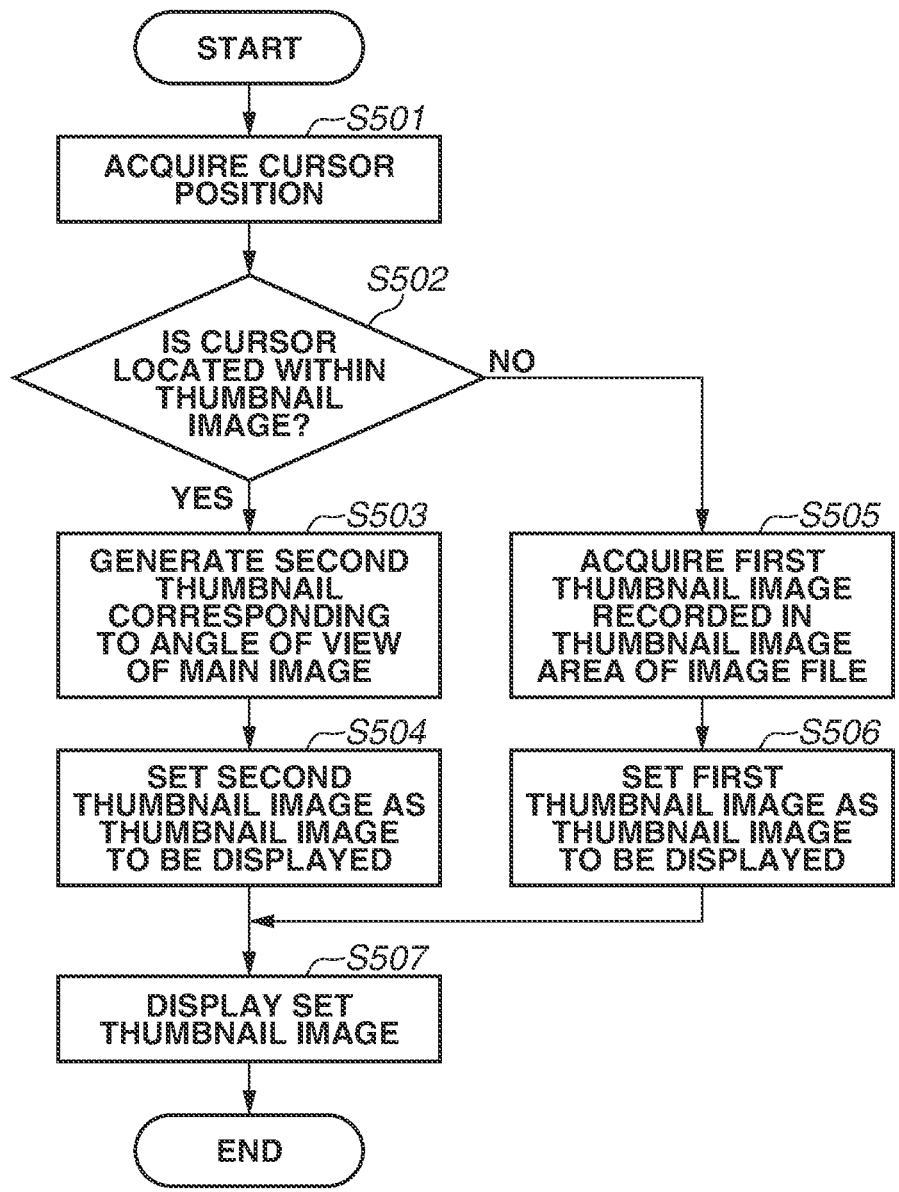

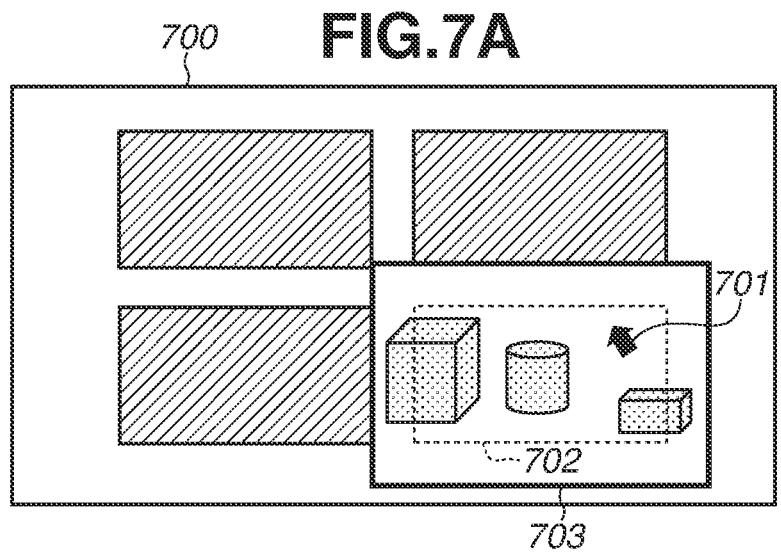
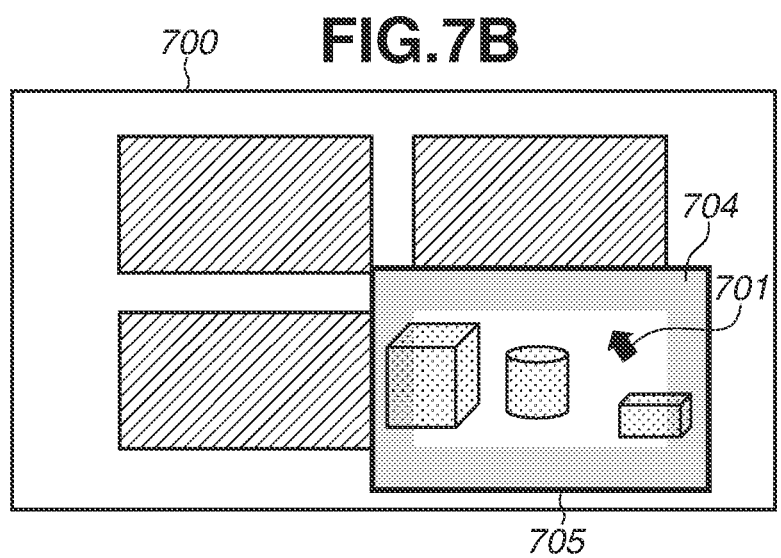
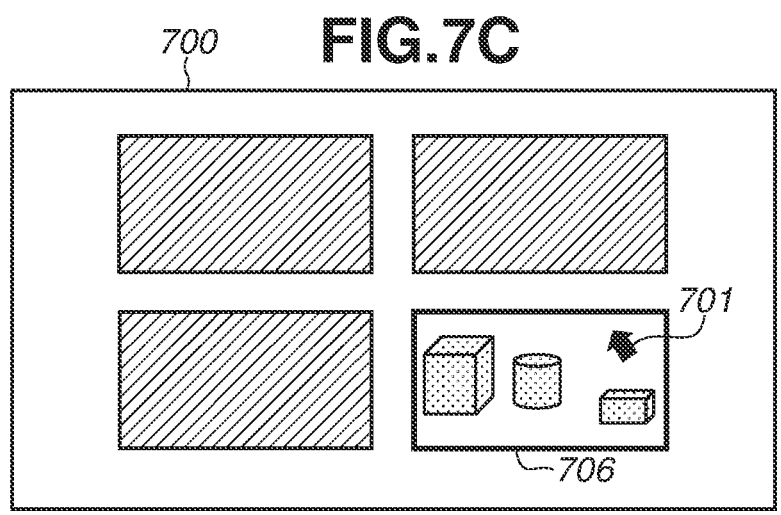

IMAGE PROCESSING APPARATUS, IMAGE PROCESSING METHOD, AND STORAGE MEDIUM

BACKGROUND OF THE INVENTION

Field of the Invention

The present invention relates to an apparatus, method and computer implemented program for processing a thumbnail image displayed on a display.

Description of the Related Art

A video see-through head-mounted display (HMD) is conventionally required to generate a display image by superimposing a computer graphics (CG) image on a real image (captured image) acquired by capturing an actual object. The HMD displays the display image on a display element such as a liquid crystal display (LCD), and introduces light from the display element to the eyes of an observer by a display optical system. Generally, in order to easily match positions of the captured image and the display image, an angle of view (i.e., a viewing angle) at which the HMD captures an image (hereinafter, called "imaging angle of view") is wider than an angle of view of an image displayed on the display element (hereinafter, called "display angle of view"). Further, when an observer uses a screenshot function to record an observed display image as an image file, the HMD generally records the display image as an image file having a display angle of view (i.e., the screenshot function does not apply any change to the viewing angle of the recorded screenshot image). Therefore, when the recorded screenshot image is reproduced and observed on an external display later, it is not possible to check the surroundings of the display angle of view.

With respect to the above-described video see-through HMD, Japanese Patent Application Laid-Open No. 2018-23026 discusses a technique for generating an image having an angle of view wider than that of a display image displayed on the HMD. According to the technique discussed in Japanese Patent Application Laid-Open No. 2018-23026, an image having an angle of view wider than that of the display image can be displayed on the external display.

SUMMARY OF THE INVENTION

According to an aspect of the present invention, an image processing apparatus which executes processing for displaying a thumbnail image on a screen includes one or more hardware processors, at least one memory coupled to the one or more hardware processors, the at least one memory having instructions stored therein which, when executed by the one or more hardware processors, cause the image processing apparatus to execute the processing for displaying a thumbnail image on a screen, an input unit configured to input an image file including a main image having an angle of view wider than an angle of view of the thumbnail image, and a control unit configured to execute control for displaying the main image on the screen as a thumbnail image in a case where a cursor is located in a thumbnail display area on the screen.

Further features of the present invention will become apparent from the following description of embodiments with reference to the attached drawings.

BRIEF DESCRIPTION OF THE DRAWINGS

FIG. 5 is a flowchart illustrating an example of processing of an image processing method executed by the image processing apparatus illustrated in FIGS. 3 and 4 according to the first embodiment.

FIGS. 7A, 7B, and 7C are diagrams illustrating a display method of a thumbnail image when a cursor is located in a thumbnail display area of an image file on a screen according to a third embodiment.

DESCRIPTION OF THE EMBODIMENTS

Figure 1:
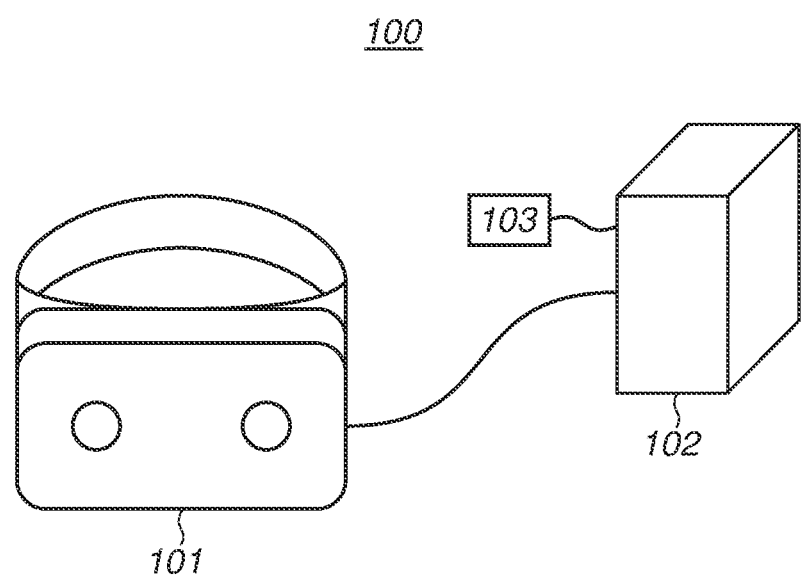
FIG. 1 is a diagram illustrating an example of a general configuration of an image display system (video see-through head-mounted display (HMD) system) according to a first embodiment.

Hereinafter, embodiments of the present invention (i.e., exemplary embodiments) will be described below with reference to the appended drawings. The embodiments described hereinafter are not intended to limit the contents of the present invention, and not all of the combinations of features described in the embodiments are necessarily indispensable to the solutions of the present invention. Further, the same reference numerals are given to constituent elements similar to each other.

When a screenshot image file is generated, an image having an angle of view wider than a display angle of view is generated by the method discussed in Japanese Patent Application Laid-Open No. 2018-23026, and the generated image is set as a main image instead of an image having the display angle of view. On the other hand, an image having the display angle of view is set as a thumbnail image in a conventional manner. Then, the main image and the thumbnail image are recorded in the image file together. With this configuration, an image actually observed by an observer can be checked by displaying the thumbnail, and the surroundings thereof can be checked by displaying the main image.

On the other hand, information about the outside of the display angle of view observed by the observer through the HMD when the screenshot is saved cannot be checked on the thumbnail image. Thus, it is necessary to open the image file and check the main image. Therefore, there is an issue that display processing of the main image requires time.

The present invention is directed to a technique which enables an observer to promptly check the information about the outside of the display angle of view observed by the observer without opening an image file and checking a main image.

First, a first embodiment is described.

In the present embodiment, when a list of files indicated by thumbnail images is displayed on a screen, the following processing is executed with respect to an image file including a main image having an angle of view wider than an angle of view of a thumbnail image.

Specifically, according to the processing described in the present embodiment, an angle of view of a displayed thumbnail image is changed depending on a position of a cursor operated by a user who is an observer.

FIG. 1 is a diagram illustrating an example of a general configuration of an image display system (video see-through HMD system) 100 according to the present embodiment. As illustrated in FIG. 1, the image display system 100 includes a video see-through HMD 101 (i.e., a display), an image processing apparatus 102, and a user input apparatus 103.

The HMD 101 is a head-mounted display mounted on the head of the observer, which allows the observer to observe a captured image for the left eye and a captured image for the right eye acquired by image capturing through the right eye and the left eye, respectively, of the observer. The HMD 101 is a video see-through type HMD.

The image processing apparatus 102 processes the image acquired by the HMD 101. In the present embodiment, the image processing apparatus 102 and the HMD 101 are connected to each other by a video signal line such as a high-definition multimedia interface (HDMI) (registered trademark) cable, or a data signal line such as a universal serial bus (USB) cable, and transmit and receive image data and control signals.

The user input apparatus 103 accepts input from a user who is an observer who wears the HMD 101 on the head to the image processing apparatus 102. For example, the user input apparatus 103 may include a keyboard, a mouse, and a controller.

Figure 2:
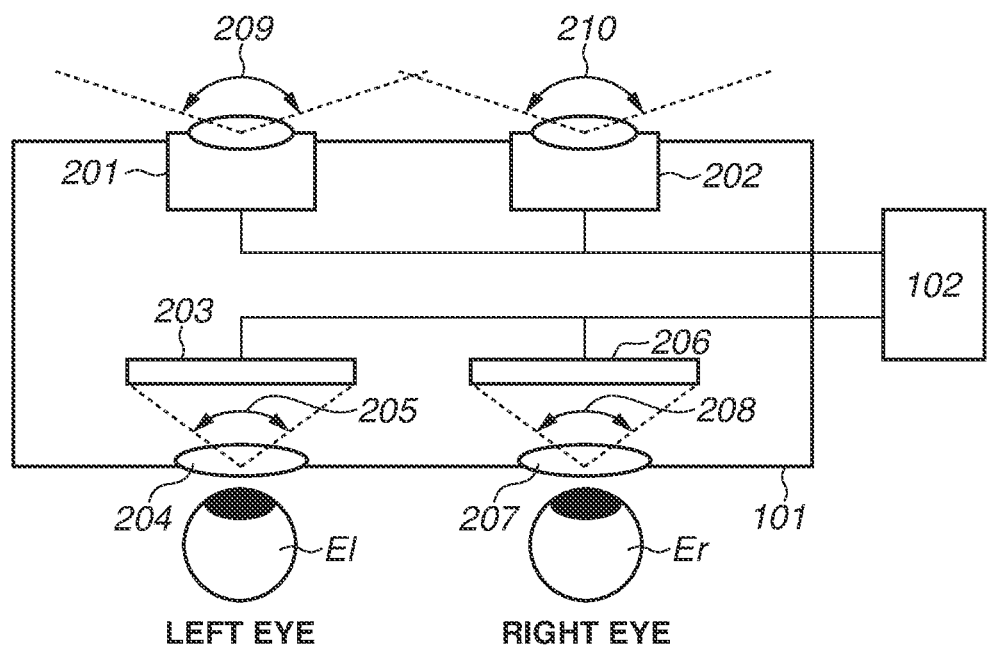
FIG. 2 is a diagram illustrating an example of an internal configuration of the HMD illustrated in FIG. 1.

FIG. 2 is a diagram illustrating an example of the internal configuration of the HMD 101 illustrated in FIG. 1.

As illustrated in FIG. 2, the HMD 101 includes a left-eye background camera 201 and a right-eye background camera 202 for acquiring real images of an actual world that are arranged at positions corresponding to a right eye Er and a left eye El of an observer. A left-eye imaging angle of view 209 and a right-eye imaging angle of view 210 are the imaging angle of views of these background cameras 201 and 202. In the present embodiment, for the sake of simplicity of description, the left-eye imaging angle of view 209 and the right-eye imaging angle of view 210 are assumed to be equal, and are also simply referred to as "imaging angle of view". Furthermore, as illustrated in FIG. 2, in order to allow the observer to observe the image, the HMD 101 includes a left-eye display 203 and a right-eye display 206 arranged respectively for the left eye El and the right eye Er of the observer. Each of the left-eye display 203 and the right-eye display 206 includes a display panel such as a liquid crystal panel or an organic electroluminescence (EL) panel. Further, as illustrated in FIG. 2, the HMD 101 includes a left-eye eyepiece lens 204 and a right-eye eyepiece lens 207 arranged in front of the displays 203 and 206. The observer observes enlarged virtual images of display images displayed on the displays 203 and 206 respectively through the eyepiece lenses 204 and 207. A left-eye display angle of view 205 and a right-eye display angle of view 208 are display angle of views of a display unit (i.e., a display) including the displays 203 and 206 and the eyepiece lenses 204 and 207. In the present embodiment, for the sake of simplicity of description, the left-eye display angle of view 205 and the right-eye display angle of view 208 are assumed to be equal, and are also simply referred to as "display angle of view". The HMD 101 further includes various sensors (not illustrated) for acquiring a position and an orientation of the observer. Herein, the respective imaging angle of views of the background cameras 201 and 202, i.e., the left-eye imaging angle of view 209 and the right-eye imaging angle of view 210, are designed to be wider than the display angle of views of the display unit, i.e., the left-eye display angle of view 205 and the right-eye display angle of view 208.

The HMD 101 is mounted on the head of the observer (not illustrated) and allows the observer to observe enlarged virtual images of a left-eye display image and a right-eye display image through the left eye El and the right eye Er of the observer.

The image processing apparatus 102 generates a first image by superimposing a CG rendering image on a real image acquired from each of the left-eye background camera 201 and the right-eye background camera 202 of the HMD 101. Then, the image processing apparatus 102 acquires an image area corresponding to the display angle of view of the HMD 101 from the first image and generates a left-eye display image and a right-eye display image. Then, the image processing apparatus 102 displays the generated display images on the left-eye display 203 and the right-eye display 206 of the HMD 101.

While a configuration according to the present embodiment is described as a system configuration in which the image processing apparatus 102 is provided independently from the HMD 101, an integrated HMD system in which the image processing apparatus 102 is internally included in the HMD 101 can also be employed. Further, while a system configuration in which the user input apparatus 103 is connected to the image processing apparatus 102 by wire is described, a system configuration in which the user input apparatus 103 is connected to the image processing apparatus 102 by a known wireless technique such as the Bluetooth (registered trademark) can also be employed.

Figure 3:
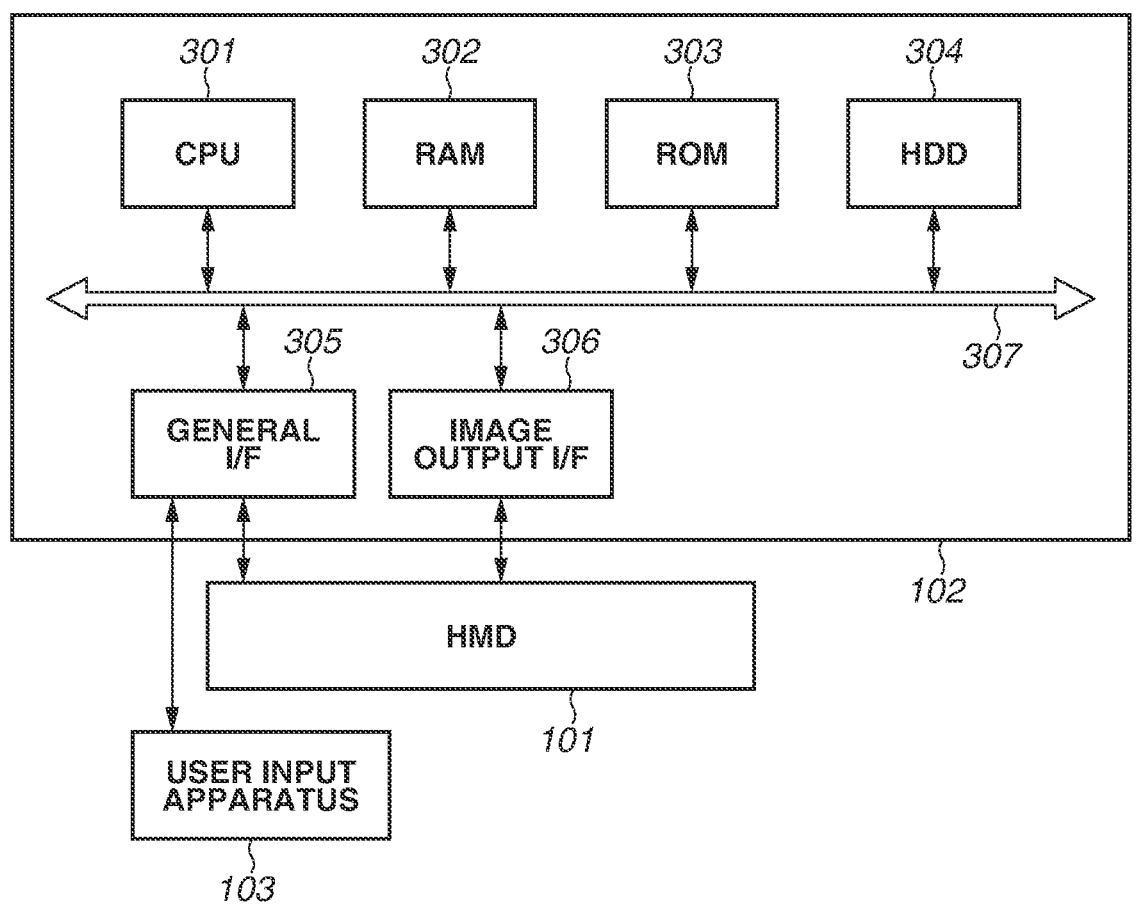
FIG. 3 is a block diagram illustrating an example of a system configuration of an image processing apparatus illustrated in FIG. 1.

FIG. 3 is a block diagram illustrating an example of a system configuration of the image processing apparatus 102 illustrated in FIG. 1.

As illustrated in FIG. 3, the image processing apparatus 102 has a system configuration including a central processing unit (CPU) 301, a random access memory (RAM) 302, a read only memory (ROM) 303, a hard disk drive (HDD) 304, a general interface (I/F) 305, an image output I/F 306, and a main bus 307.

The CPU 301 is a processor which generally controls units included in the image processing apparatus 102. The RAM 302 functions as a main memory and a work area of the CPU 301. The ROM 303 stores a group of programs executed by the CPU 301. The HDD 304 stores an application executed by the CPU 301 and data used for image processing. The general I/F 305 is a serial bus interface such as a USB or a serial bus interface compliant with the Institute of Electrical and Electronics Engineers (IEEE) 1394, and is connected with the user input apparatus 103. The user who is an observer can transmit a command such as a screenshot command to the image processing apparatus 102 via the user input apparatus 103. The general I/F 305 is also connected with the HMD 101 and is used for acquisition of images captured by the left-eye background camera 201 and the right-eye background camera 202 and acquisition of position/orientation information. In the present embodiment, the general I/F 305 is configured to function as an input unit for inputting an image file including a main image having an angle of view wider than that of a thumbnail image to the CPU 301 (including the RAM 302 and the HDD 304) of the image processing apparatus 102. The image output I/F 306 is an interface such as an HDMI or DisplayPort used for displaying a display image on the HMD 101. The main bus 307 communicably connects the CPU 301, the RAM 302, the ROM 303, the HDD 304, the general I/F 305, and the image output I/F 306.

Figure 4:
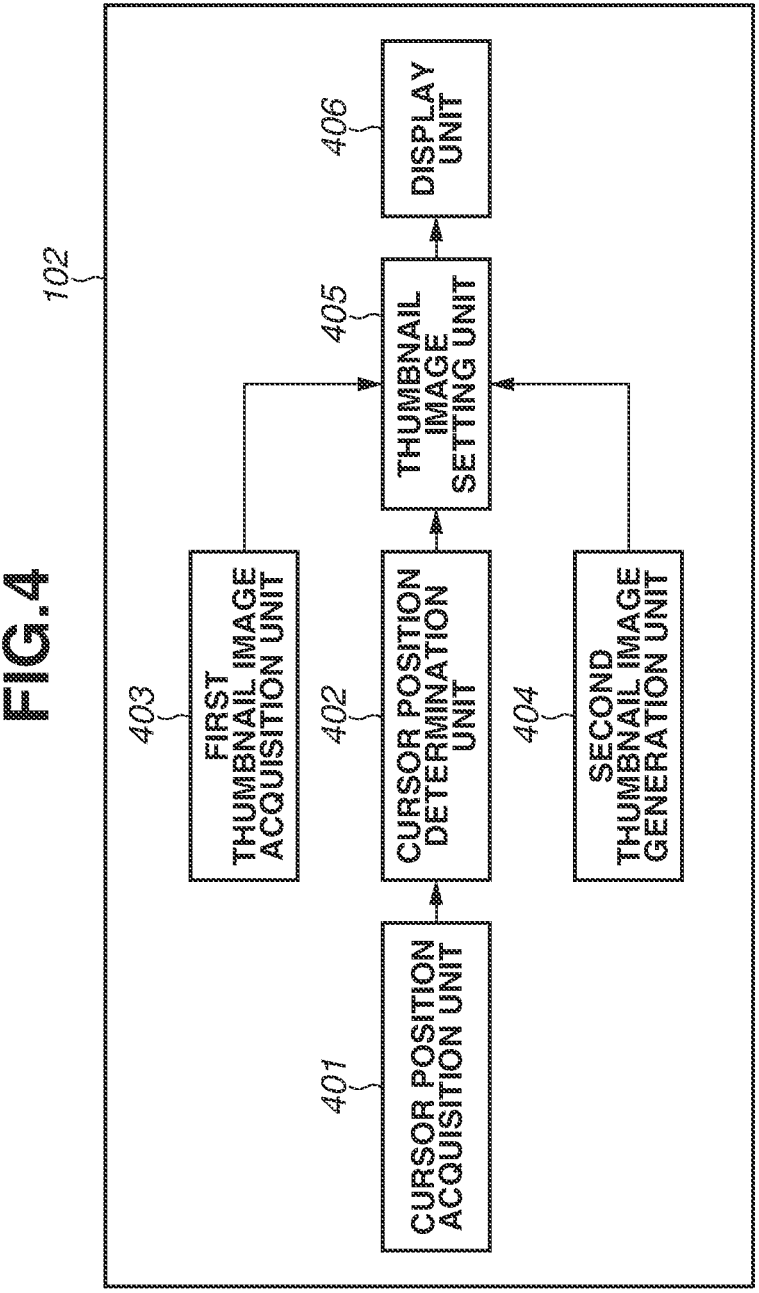
FIG. 4 is a block diagram illustrating an example of a configuration of the image processing apparatus illustrated in FIGS. 1 and 3 according to the first embodiment.

FIG. 4 is a block diagram illustrating an example of a configuration of the image processing apparatus 102 illustrated in FIGS. 1 and 3 according to the first embodiment.

The image processing apparatus 102 in FIG. 4 includes a cursor position acquisition unit 401, a cursor position determination unit 402, a first thumbnail image acquisition unit 403, a second thumbnail image generation unit 404, a thumbnail image setting unit 405, and a display unit 406. For example, a program stored in the ROM 303 is executed by the CPU 301 illustrated in FIG. 3, so that respective constituent elements 401 to 406 illustrated in FIG. 4 are implemented.

With respect to an image file including a main image having an angle of view wider than a first angle of view of a thumbnail image, the image processing apparatus 102 executes processing for displaying a list of files indicated by thumbnail images on the screen of each of the left-eye display 203 and the right-eye display 206.

The cursor position acquisition unit 401 is a position acquisition unit for acquiring a position of a cursor operated by a user who is an observer who wears the HMD 101 on the head to select an image file. Then, the cursor position acquisition unit 401 outputs the acquired cursor position to the cursor position determination unit 402.

The cursor position determination unit 402 is a position determination unit for determining whether the cursor position acquired by the cursor position acquisition unit 401 is a position within a thumbnail display area (thumbnail image) of an image file on the screen. Then, the cursor position determination unit 402 outputs a determination result to the thumbnail image setting unit 405.

The first thumbnail image acquisition unit 403 is an image acquisition unit for acquiring a thumbnail image having the first angle of view recorded in an image file as a first thumbnail image. Then, the first thumbnail image acquisition unit 403 outputs the acquired first thumbnail image to the thumbnail image setting unit 405.

The second thumbnail image generation unit 404 is an image generation unit for generating a second thumbnail image having a second angle of view different from the first angle of view of the above-described first thumbnail image.

In the present embodiment, the second thumbnail image generation unit 404 generates a thumbnail image having the second angle of view (i.e., an angle of view wider than the first angle of view) which is the same as the angle of view of the main image recorded in the image file as the second thumbnail image. In other words, the second thumbnail image generation unit 404 receives the main image and generates the second thumbnail image. Then, the second thumbnail image generation unit 404 outputs the generated second thumbnail image to the thumbnail image setting unit 405.

The thumbnail image setting unit 405 is an image setting unit for setting a thumbnail image to be displayed in the thumbnail display area depending on a result of determination on whether the cursor is located in the thumbnail display area of the image file on the screen, made by the cursor position determination unit 402. Specifically, in a case where the cursor is located in the thumbnail display area of the image file on the screen, the thumbnail image setting unit 405 sets the second thumbnail image as the above-described thumbnail image to be displayed in the thumbnail display area. Further, in a case where the cursor is not located in the thumbnail display area of the image file on the screen, the thumbnail image setting unit 405 sets the first thumbnail image as the above-described thumbnail image to be displayed in the thumbnail display area. Then, the thumbnail image setting unit 405 outputs the set thumbnail image to the display unit 406. Alternatively, the thumbnail image setting unit 405 may output a control signal for controlling the display unit 406 to display the set thumbnail image on the display unit 406. In this case, the thumbnail image setting unit 405 is configured to function as a control unit in the image processing apparatus 102. The control unit may also include the cursor position acquisition unit 401, the cursor position determination unit 402, the first thumbnail image acquisition unit 403, and the second thumbnail image generation unit 404 in addition to the thumbnail image setting unit 405.

The display unit 406 is a display unit for displaying the thumbnail image set by the thumbnail image setting unit 405 in the thumbnail display area of the image file on the screen of each of the left-eye display 203 and the right-eye display 206.

Next, processing executed by the image processing apparatus 102 of the present embodiment based on a cursor operation performed by the user who is an observer who wears the HMD 101 on the head will be described.

FIG. 5 is a flowchart illustrating an example of processing of an image processing method executed by the image processing apparatus 102 illustrated in FIGS. 3 and 4 according to the present embodiment. The CPU 301 in FIG. 3 reads a program for executing the processing of the flowchart in FIG. 5 stored in the ROM 303 or the HDD 304, and executes the processing by using the RAM 302 as a work area. Through the above processing, the CPU 301 in FIG. 3 serves as the functional constituent elements illustrated in FIG. 4. In addition, each processing step in the flowchart in FIG. 5 is expressed by a symbol "S".

In step S501, the cursor position acquisition unit 401 acquires a cursor position input to the user input apparatus 103 by an operation for selecting the image file performed by the user. At this time, as the cursor position, for example, the cursor position acquisition unit 401 acquires a coordinate value in an orthogonal coordinate system which sets an upper left of the screen of each of the left-eye display 203 and the right-eye display 206 as an origin.

In step S502, the cursor position determination unit 402 determines whether the cursor position acquired in step S501 is a position within the thumbnail display area of an image file on the screen.

The processing in step S502 is described with reference to FIGS. 6A and 6B.

Figure 6A:
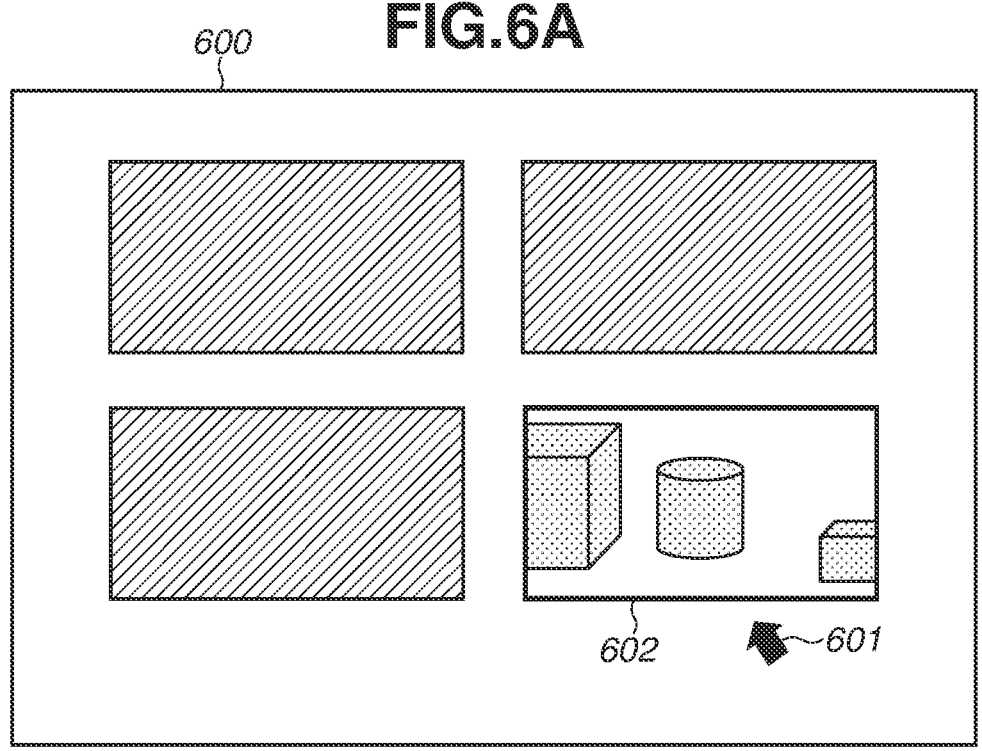
FIGS. 6A and 6B are diagrams illustrating a display method of a thumbnail image which is changed depending on whether a cursor is located in a thumbnail display area of an image file on a screen according to the first embodiment.
Figure 6B:
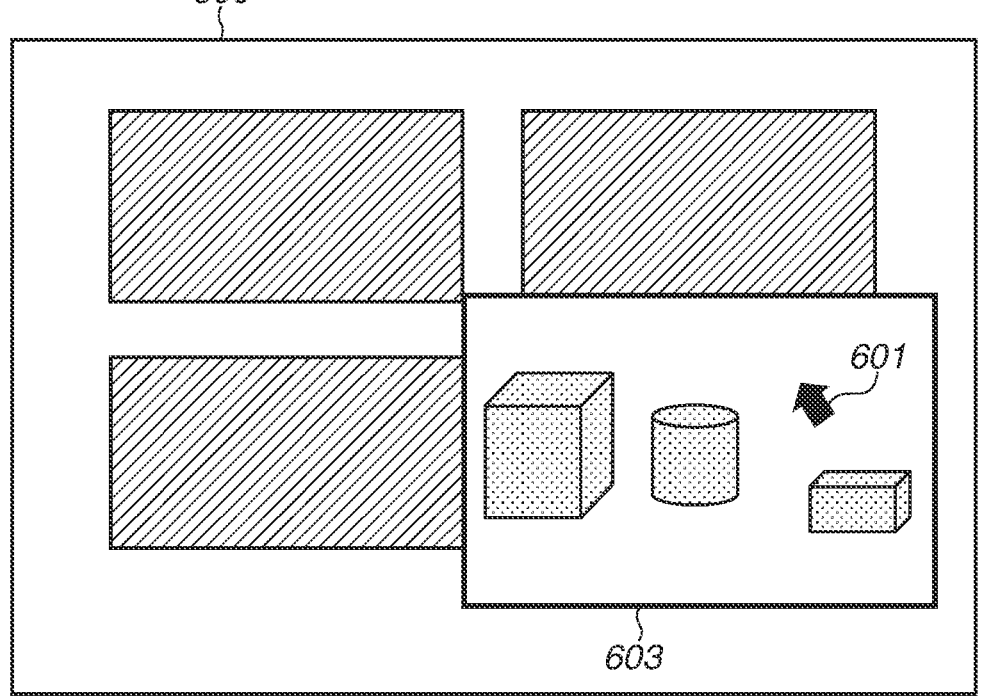

FIGS. 6A and 6B are diagrams illustrating a display method of a thumbnail image which is changed depending on whether a cursor is located in a thumbnail display area of an image file on a screen 600 according to the present embodiment. FIG. 6A illustrates an example of a cursor 601 located outside the thumbnail display area on the screen 600 of each of the left-eye display 203 and the right-eye display 206. FIG. 6B illustrates an example of the cursor 601 located in the thumbnail display area on the screen 600 of each of the left-eye display 203 and the right-eye display 206. In step S502 in FIG. 5, a position of the cursor 601 can be determined by comparison of a coordinate value indicating the position of the cursor 601 with coordinate values indicating the thumbnail display area where the thumbnail image is displayed (e.g., an upper left coordinate and a lower right coordinate of the thumbnail display area).

The processing is described with reference to FIG. 5 again.

As a result of determination in step S502, in a case where the cursor position acquired in step S501 is a position within the thumbnail display area of the image file on the screen (YES in step S502), the processing proceeds to step S503.

In step S503, the second thumbnail image generation unit 404 executes reduction processing on the main image included in the image file indicated by the cursor by a known method such as the bilinear interpolation method and generates the second thumbnail image having the second angle of view corresponding to the angle of view of the main image. The second thumbnail image generated in step S503 is cached in the RAM 302 illustrated in FIG. 3. In a case where the cached image data of the second thumbnail image has already been generated, the second thumbnail image generation unit 404 can read the image data instead of executing the processing for generating the second thumbnail image, so that the above-described reduction processing of the main image does not have to be executed each time.

Next, in step S504, the thumbnail image setting unit 405 sets the second thumbnail image generated in step S503 as the thumbnail image to be displayed in the thumbnail display area of the image file on the screen.

As a result of determination in step S502, in a case where the cursor position acquired in step S501 is a position outside the thumbnail display area of the image file on the screen (NO in step S502), the processing proceeds to step S505.

In step S505, the first thumbnail image acquisition unit 403 acquires a thumbnail image having the first angle of view recorded in the image file as the first thumbnail image. The first angle of view of the first thumbnail image is narrower than the second angle of view of the main image or the second thumbnail image.

Next, in step S506, the thumbnail image setting unit 405 sets the first thumbnail image acquired in step S505 as a thumbnail image to be displayed in the thumbnail display area of the image file on the screen.

When the processing in step S504 or S506 is ended, the processing proceeds to step S507.

In step S507, the display unit 406 displays the thumbnail image set in step S504 or S506 in the thumbnail display area of the corresponding image file on the screen of each of the left-eye display 203 and the right-eye display 206. In FIG. 6A, since the cursor 601 is located outside the display area of a thumbnail image 602 on the screen 600, the first thumbnail image 602 recorded in the image file is displayed thereon. On the other hand, in FIG. 6B, since the cursor 601 is located inside the display area of a thumbnail image 603, the second thumbnail image 603 having an angle of view wider than that of the first thumbnail image 602 is displayed thereon. In the example illustrated in FIG. 6B, the second thumbnail image generation unit 404 generates the second thumbnail image 603 having a size larger than that of the first thumbnail image 602. Further, as described above, in the present embodiment, the angle of view (i.e., the second angle of view) of the second thumbnail image 603 conforms to (i.e., is equal to) the angle of view of the main image recorded in the image file.

When the processing in step S507 is ended, the processing illustrated in the flowchart in FIG. 5 is ended.

When a list of files indicated by thumbnail images is displayed on the screen, the image processing apparatus 102 according to the above-described present embodiment executes the following processing with respect to an image file including a main image having an angle of view wider than that of the thumbnail image. Specifically, the cursor position acquisition unit 401 acquires a position of a cursor operated by the user who is an observer who wears the HMD 101 on their head. The first thumbnail image acquisition unit 403 acquires the first thumbnail image having the first angle of view recorded in the image file. Further, the second thumbnail image generation unit 404 generates the second thumbnail image having the second angle of view (in the present embodiment, an angle of view wider than the first angle of view) different from the first angle of view of the first thumbnail image. Then, the thumbnail image setting unit 405 sets a thumbnail image to be displayed in the thumbnail display area depending on whether the cursor position acquired by the cursor position acquisition unit 401 is a position within the thumbnail display area of the image file on the screen. Specifically, in a case where the cursor is located in a thumbnail display area of an image file on the screen, the thumbnail image setting unit 405 sets the second thumbnail image as the thumbnail image to be displayed in the thumbnail display area. Then, the display unit 406 displays the thumbnail image set by the thumbnail image setting unit 405 in the thumbnail display area of the image file on the screen of each of the left-eye display 203 and the right-eye display 206.

With the above-described configuration, with respect to an image file including a main image having an angle of view wider than that of a thumbnail image, an angle of view of the thumbnail image to be displayed can be changed depending on a position of the cursor operated by the user when a list of files indicated by thumbnail images is displayed on the screen. Accordingly, the observer can promptly check the information about the outside of the display angle of view observed thereby without opening the image file and checking the main image.

Next, a second embodiment will be described. In the present embodiment described below, descriptions of items common to those described in the first embodiment are omitted, and items different from the first embodiment are described.

In the present embodiment, the following processing is executed with respect to an image file including a main image having an angle of view wider than that of a thumbnail image when a list of files indicated by thumbnail images is to be displayed on a screen.

Specifically, in the present embodiment, in a case where a cursor operated by the user who is an observer is located in a thumbnail display area of an image file on the screen, the image processing apparatus 102 executes processing to change the angle of view of the thumbnail image to be displayed to an angle of view which includes a central part of the main image cut out from the main image.

A general configuration of the image display system (video see-through HMD system) 100 according to the present embodiment is similar to that of the image display system (video see-through HMD system) 100 according to the first embodiment illustrated in FIG. 1. Further, an internal configuration of the HMD 101 according to the present embodiment is similar to that of the HMD 101 according to the first embodiment illustrated in FIG. 2. Furthermore, a system configuration of the image processing apparatus 102 according to the present embodiment is similar to that of the image processing apparatus 102 according to the first embodiment illustrated in FIG. 3.

Figure 8:
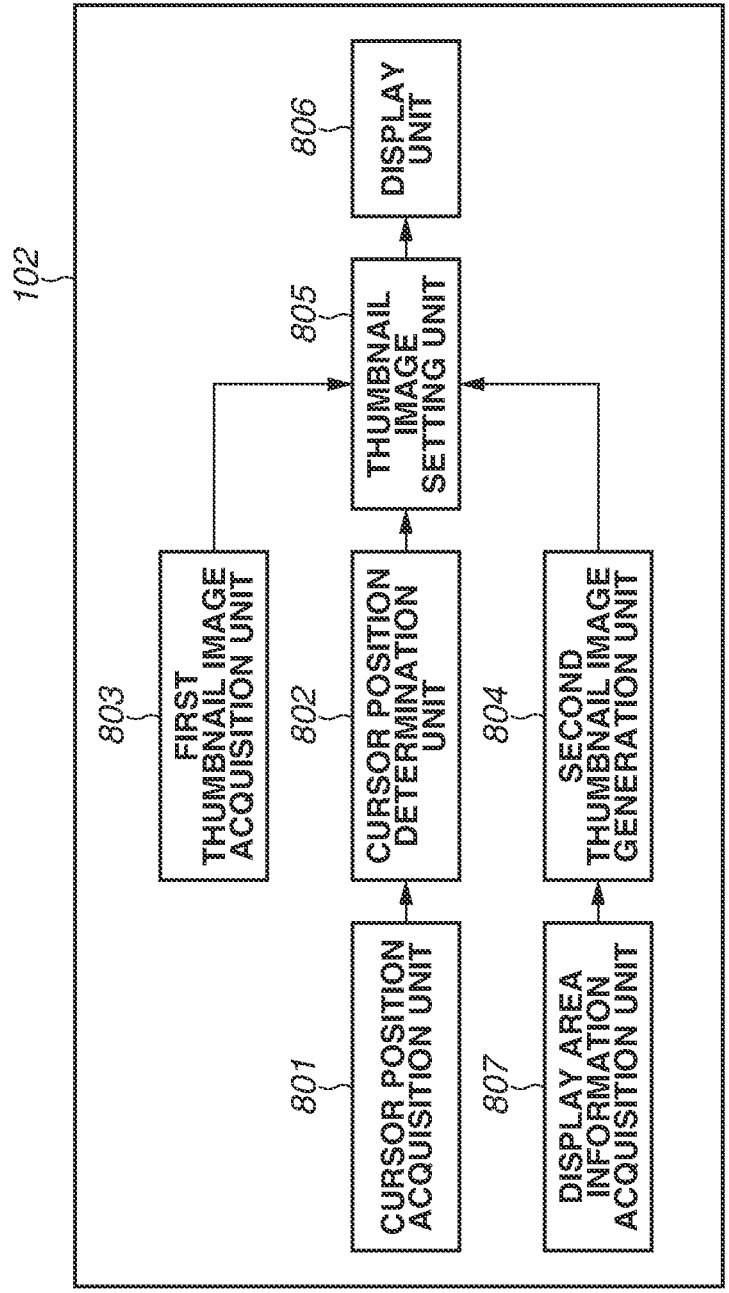
FIG. 8 is a block diagram illustrating an example of a functional configuration of the image processing apparatus illustrated in FIGS. 1 and 3 according to a second embodiment.

FIG. 8 is a block diagram illustrating an example of a functional configuration of the image processing apparatus 102 illustrated in FIGS. 1 and 3 according to the present embodiment.

The image processing apparatus 102 in FIG. 8 includes a cursor position acquisition unit 801, a cursor position determination unit 802, a first thumbnail image acquisition unit 803, a second thumbnail image generation unit 804, a thumbnail image setting unit 805, a display unit 806, and a display area information acquisition unit 807.

The cursor position acquisition unit 801 has a function similar to the function of the cursor position acquisition unit 401 in FIG. 4. In other words, the cursor position acquisition unit 801 is a position acquisition unit for acquiring a position of a cursor operated by the user who is an observer who wears the HMD 101 on their head to select an image file. Then, the cursor position acquisition unit 801 outputs the acquired cursor position to the cursor position determination unit 802.

The cursor position determination unit 802 has a function similar to the function of the cursor position determination unit 402 in FIG. 4. In other words, the cursor position determination unit 802 is a position determination unit for determining whether the cursor position acquired by the cursor position acquisition unit 801 is a position within a thumbnail display area (thumbnail image) of an image file on the screen. Then, the cursor position determination unit 802 outputs a determination result to the thumbnail image setting unit 805.

The first thumbnail image acquisition unit 803 has a function similar to the function of the first thumbnail image acquisition unit 403 in FIG. 4. In other words, the first thumbnail image acquisition unit 803 is an image acquisition unit for acquiring a thumbnail image having a first angle of view recorded in an image file as a first thumbnail image. Then, the first thumbnail image acquisition unit 803 outputs the acquired first thumbnail image to the thumbnail image setting unit 805.

The display area information acquisition unit 807 is an information acquisition unit for acquiring display area information describing a size of a partial area (image area) of the main image corresponding to the first thumbnail image from metadata of the image file. In the present embodiment, the display area information includes information about a width and a height of the partial area of the main image corresponding to the first thumbnail image. Then, the display area information acquisition unit 807 outputs the acquired display area information to the second thumbnail image generation unit 804.

The second thumbnail image generation unit 804 has a function similar to the function of the second thumbnail image generation unit 404 in FIG. 4. In other words, the second thumbnail image generation unit 804 is an image generation unit for generating a second thumbnail image having a second angle of view different from the first angle of view of the above-described first thumbnail image. Specifically, based on the display area information received from the display area information acquisition unit 807, the second thumbnail image generation unit 804 generates an image having an angle of view which includes a central part of the main image cut out therefrom in a size of the partial area of the main image corresponding to the first thumbnail image as the second thumbnail image. Then, the second thumbnail image generation unit 804 outputs the generated second thumbnail image to the thumbnail image setting unit 805.

The thumbnail image setting unit 805 has a function similar to the function of the thumbnail image setting unit 405 in FIG. 4. In other words, the thumbnail image setting unit 805 is an image setting unit for setting a thumbnail image to be displayed in the thumbnail display area depending on a result of determination on whether the cursor is located in the thumbnail display area of the image file on the screen, made by the cursor position determination unit 802. Specifically, in a case where the cursor is located in the thumbnail display area of the image file on the screen, the thumbnail image setting unit 805 sets the second thumbnail image as the above-described thumbnail image to be displayed in the thumbnail display area. Further, in a case where the cursor is not located in the thumbnail display area of the image file on the screen, the thumbnail image setting unit 805 sets the first thumbnail image as the above-described thumbnail image to be displayed in the thumbnail display area. Then, the thumbnail image setting unit 805 outputs the set thumbnail image to the display unit 806.

The display unit 806 has a function similar to the function of the display unit 406 in FIG. 4. In other words, the display unit 806 is a display unit for displaying the thumbnail image set by the thumbnail image setting unit 805 in the thumbnail display area of the image file on the screen of each of the left-eye display 203 and the right-eye display 206.

Next, processing executed by the image processing apparatus 102 of the present embodiment based on a cursor operation performed by the user who is an observer who wears the HMD 101 on the head will be described.

Figure 9:
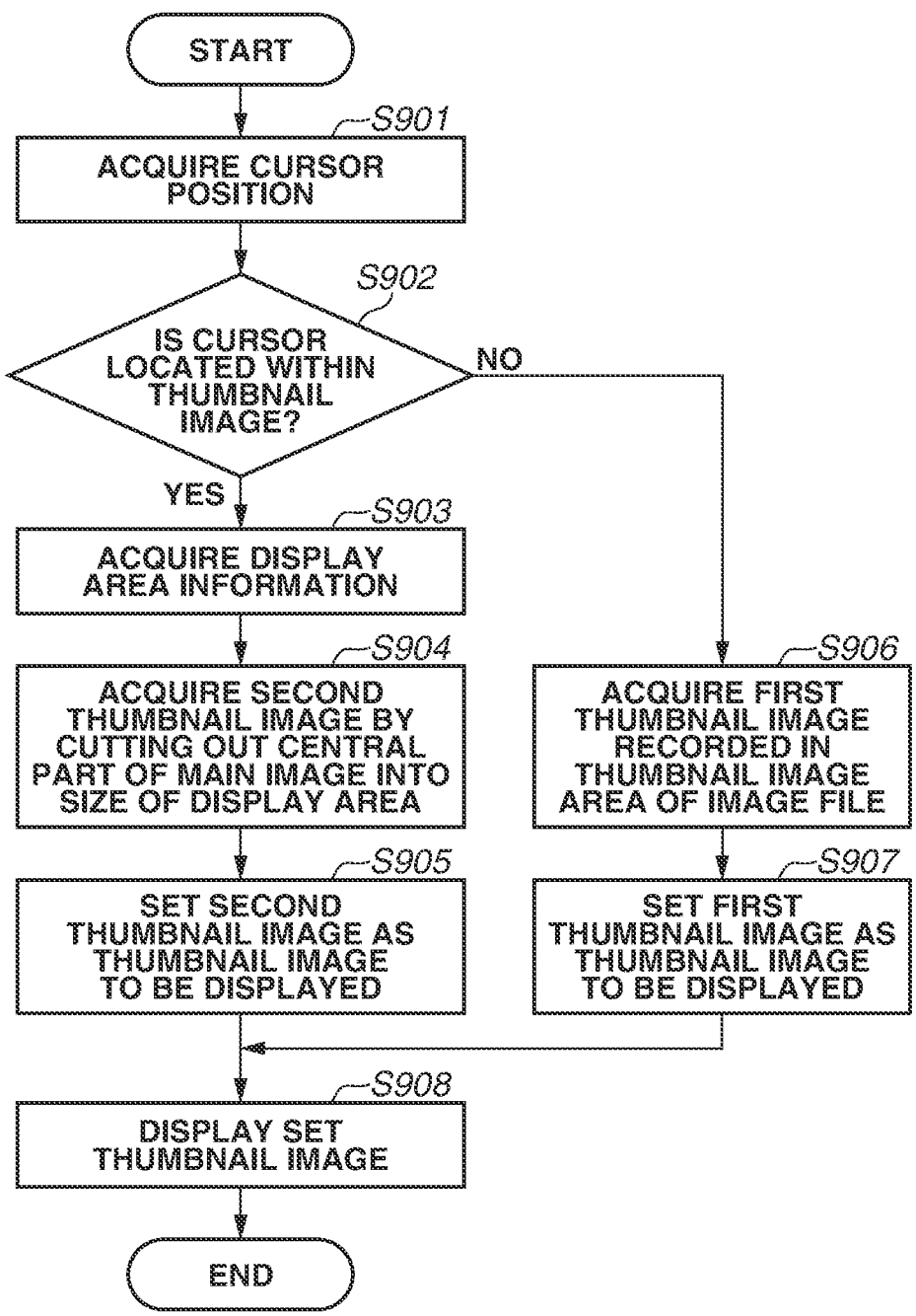
FIG. 9 is a flowchart illustrating an example of processing of an image processing method executed by the image processing apparatus illustrated in FIGS. 3 and 8 according to the second embodiment.

FIG. 9 is a flowchart illustrating an example of processing of an image processing method executed by the image processing apparatus 102 illustrated in FIGS. 3 and 8 according to the present embodiment. The CPU 301 in FIG. 3 reads a program for executing the processing of the flowchart in FIG. 9 stored in the ROM 303 or the HDD 304, and executes the processing by using the RAM 302 as a work area. Through the above processing, the CPU 301 in FIG. 3 serves as the functional constituent elements illustrated in FIG. 4. In addition, each processing step in the flowchart in FIG. 9 is expressed by a symbol "S".

In step S901, the cursor position acquisition unit 401 acquires a cursor position input to the user input apparatus 103 by an operation for selecting the image file performed by the user. At this time, as the cursor position, for example, the cursor position acquisition unit 801 acquires a coordinate value in an orthogonal coordinate system which sets an upper left of the screen of each of the left-eye display 203 and the right-eye display 206 as an origin.

In step S902, the cursor position determination unit 802 determines whether the cursor position acquired in step S901 is a position within a thumbnail display area of an image file on the screen.

The processing in step S902 is described with reference to FIGS. 10A and 10B.

Figure 10A:
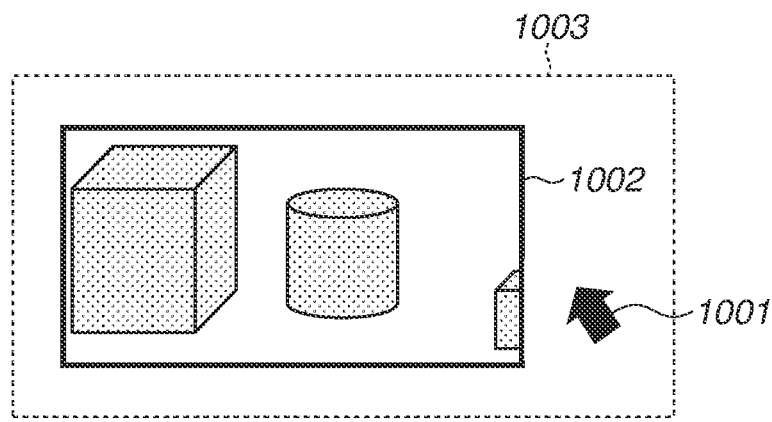
FIGS. 10A and 10B are diagrams illustrating a display method of a thumbnail image which is changed depending on whether a cursor is located in a thumbnail display area of an image file on a screen according to the second embodiment.
Figure 10B:
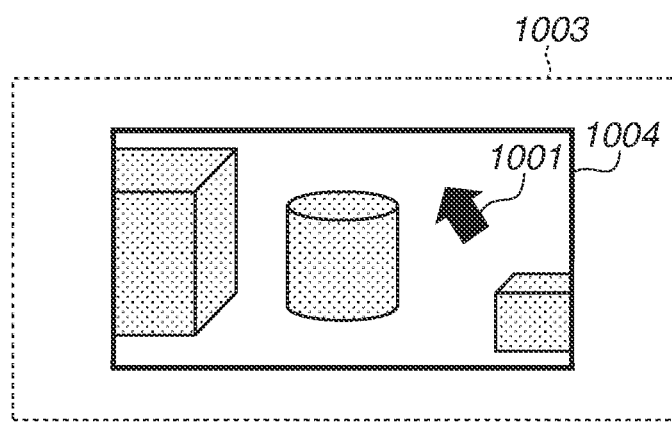

FIGS. 10A and 10B are diagrams illustrating a display method of a thumbnail image which is changed depending on whether a cursor is located in a thumbnail display area of an image file on a screen according to the present embodiment. FIG. 10A illustrates an example of a cursor 1001 located outside the thumbnail display area on the screen of each of the left-eye display 203 and the right-eye display 206. FIG. 10B illustrates an example of the cursor 1001 located in the thumbnail display area on the screen of each of the left-eye display 203 and the right-eye display 206. In step S902 in FIG. 9, a position of the cursor 1001 can be determined by comparison of a coordinate value indicating the position of the cursor 1001 with coordinate values indicating the thumbnail display area where the thumbnail image is displayed (e.g., an upper left coordinate and a lower right coordinate of the thumbnail display area).

The processing is described with reference to FIG. 9 again.

As a result of determination in step S902, in a case where the cursor position acquired in step S901 is a position within the thumbnail display area of the image file on the screen (YES in step S902), the processing proceeds to step S903.

In step S903, the display area information acquisition unit 807 acquires display area information describing a size of the partial area of the main image corresponding to the first thumbnail image from the metadata of the image file. Herein, because an angle of view of a first thumbnail image 1002 in FIG. 10A is narrower than that of a main image 1003, the first thumbnail image 1002 is an image corresponding to the partial area of the main image 1003. In other words, the display area information acquired in step S903 is information for specifying a size of the partial area of the main image 1003 corresponding to the first thumbnail image 1002. The display area information acquisition unit 807 acquires information which includes information about a width and a height of the partial area of the main image 1003 corresponding to the first thumbnail image 1002 as the display area information. In addition, information about an upper left coordinate and a lower right coordinate in the partial area of the main image 1003 corresponding to the first thumbnail image 1002 or information about horizontal and vertical angles of view of the partial area with respect to horizontal and vertical angles of view of the main image 1003 may be acquired as the display area information. In other words, information of any type can be acquired as the display area information as long as a size (i.e., a width and a height) of the partial area of the main image 1003 corresponding to the first thumbnail image 1002 can be specified thereby.

Next, in step S904, based on the display area information acquired in step S903, the second thumbnail image generation unit 804 generates the second thumbnail image having the second angle of view different from the first angle of view of the first thumbnail image. Specifically, the second thumbnail image generation unit 804 generates the second thumbnail image by executing reduction processing on the image having an angle of view which includes the central part of the main image included in the image file indicated by the cursor, cut out therefrom in a size of the partial area of the main image corresponding to the first thumbnail image. The second thumbnail image generated in step S904 is cached in the RAM 302 illustrated in FIG. 3. In a case where the cached image data of the second thumbnail image has already been generated, the second thumbnail image generation unit 804 can read the image data instead of executing the processing for generating the second thumbnail image, so that the above-described reduction processing of the main image does not have to be executed each time.

Next, in step S905, the thumbnail image setting unit 805 sets the second thumbnail image generated in step S904 as the thumbnail image to be displayed in the thumbnail display area of the image file on the screen.

As a result of determination in step S902, in a case where the cursor position acquired in step S901 is a position outside the thumbnail display area of the image file on the screen (NO in step S902), the processing proceeds to step S906.

In step S906, the first thumbnail image acquisition unit 803 acquires a thumbnail image having the first angle of view recorded in the image file as the first thumbnail image. The first angle of view of the first thumbnail image is narrower than the angle of view of the main image.

Next, in step S907, the thumbnail image setting unit 805 sets the first thumbnail image acquired in step S906 as a thumbnail image to be displayed in the thumbnail display area of the image file on the screen.

When the processing in step S905 or S907 is ended, the processing proceeds to step S908.

In step S908, the display unit 806 displays the thumbnail image set in step S905 or S907 in the thumbnail display area of the corresponding image file on the screen of each of the left-eye display 203 and the right-eye display 206. In FIG. 10A, since the cursor 1001 is located outside the display area of the thumbnail image 1002, the first thumbnail image 1002 recorded in the image file is displayed thereon. In the example illustrated in FIG. 10A, a partial area slightly shifted to the left from the central part of the main image 1003 is used as an angle of view of the first thumbnail image 1002. On the other hand, in FIG. 10B, the cursor 1001 is located in the display area of a thumbnail image 1004. Thus, in FIG. 10B, a cut-out image of the central part of the main image 1003, i.e., the second thumbnail image 1004 having the second angle of view different from the first angle of view of the first thumbnail image 1002 is generated and displayed thereon. A reason for generating and displaying the second thumbnail image 1004 is that a main object generally exists in the central part of the main image 1003 as illustrated in FIG. 10B.

As described above, when a list of files indicated by thumbnail images is to be displayed on a screen, the image processing apparatus 102 according to the present embodiment executes the following processing with respect to an image file including a main image having an angle of view wider than that of a thumbnail image. Specifically, the display area information acquisition unit 807 acquires display area information describing a size of the partial area of the main image corresponding to the first thumbnail image from the metadata of the image file. Then, based on the display area information received from the display area information acquisition unit 807, the second thumbnail image generation unit 804 generates an image having an angle of view which includes a central part of the main image cut out therefrom in a size of the partial area of the main image corresponding to the first thumbnail image as the second thumbnail image.

With the above-described configuration, in a case where the cursor operated by the user is located in the thumbnail display area of the image file on the screen (YES in step S902), an angle of view of a displayed thumbnail image can be changed to an angle of view which includes the central part of the main image cut out from the main image. Accordingly, the observer can promptly check the information about the outside of the display angle of view observed thereby (i.e., in the example in FIGS. 10A and 10B, information about a right side area of the second thumbnail image 1004 which is not captured in the first thumbnail image 1002) without opening the image file and checking the main image.

Next, a third embodiment will be described. In the present embodiment described below, descriptions of items common to those described in the first and the second embodiments are omitted, and items different from the first and the second embodiments are described.

A general configuration of the image display system (video see-through HMD system) 100 according to the present embodiment is similar to that of the image display system (video see-through HMD system) 100 according to the first embodiment illustrated in FIG. 1. Further, an internal configuration of the HMD 101 according to the present embodiment is similar to that of the HMD 101 according to the first embodiment illustrated in FIG. 2. Further, a system configuration of the image processing apparatus 102 according to the present embodiment is similar to that of the image processing apparatus 102 according to the first embodiment illustrated in FIG. 3. Furthermore, for example, a functional configuration of the image processing apparatus 102 according to the present embodiment is similar to the functional configuration of the image processing apparatus 102 according to the second embodiment illustrated in FIG. 8.

FIGS. 7A, 7B, and 7C are diagrams illustrating a display method of a thumbnail image when a cursor 701 is located in a thumbnail display area of an image file on a screen 700 according to the present embodiment. Specifically, FIGS. 7A to 7C are diagrams illustrating modifications of the display method of the thumbnail image described in the first embodiment illustrated in FIG. 6B.

FIGS. 7A and 7B respectively illustrate second thumbnail images 703 and 705 larger than the first thumbnail image 602 in FIG. 6A, generated by the second thumbnail image generation unit 804. In FIG. 7A, the second thumbnail image generation unit 804 generates the second thumbnail image 703 to which a rectangular shape 702 is attached as information for identifying the area of the first thumbnail image 602 (i.e., an area corresponding to the angle of view of the first thumbnail image 602) in FIG. 6A. In FIG. 7B, the second thumbnail image generation unit 804 generates the second thumbnail image 705 including an area 704 having a lower luminance and corresponding to an area outside the angle of view of the first thumbnail image 602 in FIG. 6A, as the above-described information for identifying the area. In order to calculate the area corresponding to the angle of view of the first thumbnail image 602 in each of these two types of processing illustrated in FIGS. 7A and 7B, the image processing apparatus 102 includes the display area information acquisition unit 807 described in the second embodiment as a functional configuration thereof. Therefore, the second thumbnail image generation unit 804 generates the second thumbnail image 703 by using the display area information which describes a size of the partial area (image area) of the main image corresponding to the angle of view of the first thumbnail image 602, acquired by the display area information acquisition unit 807.

In FIG. 7C, the second thumbnail image generation unit 804 generates a second thumbnail image 706 having a changed angle of view without changing a size of the display area of the thumbnail image displayed on the screen. In other words, in FIG. 7C, the second thumbnail image generation unit 804 generates the second thumbnail image 706 having the same size as the size of the first thumbnail image 602 in FIG. 6A. In addition, the information for identifying the area of the first thumbnail image 602 illustrated in FIG. 6A may also be attached to the second thumbnail image 706 illustrated in FIG. 7C through the processing for attaching the rectangular shape 702 illustrated in FIG. 7A or the processing for lowering the luminance of the area 704 illustrated in FIG. 7B. Further, in the above-described embodiment, the second thumbnail image is displayed in an area where the first thumbnail image is displayed. However, the second thumbnail image may be displayed in an area different from the area where the first thumbnail image is displayed. For example, the second thumbnail image may be displayed in an area shifted from the area where the first thumbnail image is displayed, or may be displayed in a pop-up area shifted from that area.

When a list of files indicated by thumbnail images is to be displayed on the screen with respect to an image file including a main image having an angle of view wider than that of a thumbnail image, the following effect can be acquired in any of the examples in FIGS. 7A to 7C. Specifically, the angle of view of the thumbnail image displayed on the screen can be changed depending on a position of the cursor operated by the user who is an observer. With this configuration, the observer can promptly check the information about the outside of the display angle of view observed thereby without opening the image file and checking the main image.

The present invention can be realized by processing in which a program for implementing one or more functions according to the above-described embodiments is supplied to a system or an apparatus via a network or a storage medium, and one or more processors in the system or the apparatus read and execute the program. Further, the present invention can also be realized with a circuit (e.g., application specific integrated circuit (ASIC)) that implements one or more functions.

The program and the computer-readable storage medium storing the program are also included in the present invention.

In addition, the above-described embodiments of the present invention are merely examples embodying the present invention, and shall not be construed as limiting the technical range of the present invention. In other words, the present invention can be realized in diverse ways without departing from the technical spirit or main features of the present invention.

According to the present invention, the observer can promptly check the information about the outside of the display angle of view observed thereby without opening the image file and checking the main image.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to embodiments, it is to be understood that the invention is not limited to the disclosed embodiments but is defined by the scope of the following claims.

This application claims the benefit of Japanese Patent Application No. 2022-090068, filed Jun. 2, 2022, which is hereby incorporated by reference herein in its entirety.

What is claimed is:

1. An image processing apparatus which executes processing for displaying a thumbnail image on a screen, the image processing apparatus comprising:
   one or more hardware processors; and
   at least one memory coupled to the one or more hardware processors, the at least one memory having instructions stored therein which, when executed by the one or more hardware processors, cause the image processing apparatus to operate as:
   an input unit configured to input an image file including a main image having an angle of view wider than an angle of view of the thumbnail image;
   a determination unit configured to determine a position of a cursor on the screen; and
   a control unit configured to execute control, based on the position of the cursor, for displaying the thumbnail image on the screen in a case where the cursor is not located in a thumbnail display area on the screen and for displaying the main image, of which size is smaller than a size of the screen and is larger than a size of the thumbnail image, on the screen as the thumbnail image in a case where the cursor is located in the thumbnail display area on the screen.

2. The image processing apparatus according to claim 1, wherein the control unit comprises:
   a position acquisition unit configured to acquire the position of the cursor;
   an image acquisition unit configured to acquire a first thumbnail image having a first angle of view recorded in the image file;
   an image generation unit configured to generate a second thumbnail image having a second angle of view different from the first angle of view; and
   an image setting unit configured to set a thumbnail image to be displayed in the thumbnail display area depending on whether the cursor is located in the thumbnail display area, and
   wherein the control unit executes control for displaying the set thumbnail image on the screen.

3. The image processing apparatus according to claim 2, wherein the second angle of view is wider than the first angle of view.

4. The image processing apparatus according to claim 2, wherein the second angle of view is same as an angle of view of the main image recorded in the image file.

5. The image processing apparatus according to claim 2, wherein the image generation unit generates the second thumbnail image having a size larger than a size of the first thumbnail image.

6. The image processing apparatus according to claim 5, wherein the image generation unit generates the second thumbnail image to which information for identifying an area of the first thumbnail image is attached.

7. The image processing apparatus according to claim 2, wherein the image generation unit generates the second thumbnail image having a size same as a size of the first thumbnail image.

8. The image processing apparatus according to claim 2, further comprising an information acquisition unit configured to acquire, from metadata of the image file, display area information indicating a size of a partial area of the main image corresponding to the first thumbnail image,
   wherein, based on the display area information, the image generation unit generates an image having an angle of view which includes a central part of the main image cut out from the main image into the size of the partial area as the second thumbnail image.

9. The image processing apparatus according to claim 8, wherein the display area information includes information about a width and a height of the partial area.

10. The image processing apparatus according to claim 1, wherein the thumbnail image is displayed within the thumbnail display area.

11. An image processing method for executing processing for displaying a thumbnail image on a screen, the image processing method comprising:
    inputting an image file including a main image having an angle of view wider than an angle of view of the thumbnail image;
    determining a position of a cursor on the screen; and
    executing control, based on the position of the cursor, for displaying the thumbnail image on the screen in a case where the cursor is not located in a thumbnail display area on the screen and for displaying the main image, of which size is smaller than a size of the screen and is larger than a size of the thumbnail image, on the screen as the thumbnail image in a case where the cursor is located in the thumbnail display area on the screen.

12. A non-transitory computer-readable storage medium storing a program for causing a computer to execute an image processing method for executing processing for displaying a thumbnail image on a screen, the image processing method comprising:
    inputting an image file including a main image having an angle of view wider than an angle of view of the thumbnail image;
    determining a position of a cursor on the screen; and
    executing control, based on the position of the cursor, for displaying the thumbnail image on the screen in a case where the cursor is not located in a thumbnail display area on the screen and for displaying the main image, of which size is smaller than a size of the screen and is larger than a size of the thumbnail image, on the screen as the thumbnail image in a case where the cursor is located in the thumbnail display area on the screen.

* * * * *